Patented May 9, 1939

2,157,164

UNITED STATES PATENT OFFICE 2,157,164

MANUFACTURE OF ESTERS OF PHOSPHORIC ACID

Arthur John Daly and William Geoffrey Lowe, Spondon, near Derby, England, assignors to Celanese Corporation of America, a corporation of Delaware No Drawing. Application April 15, 1937, Serial No. 137,042. In Great Britain May 22, 1936

8 Claims. (Cl. 260—461)

This invention relates to the manufacture of esters of phosphoric acid and in particular to the manufacture of halogenated alkyl phosphates.

According to the invention, halogenated alkyl phosphates are prepared by reaction between an olefine oxide and a phosphorus oxyhalide in the presence of one or more of the following substances as catalyst; aluminium chloride, zinc chloride, cadmium chloride, nickel chloride, cobalt chloride, stannic chloride, lead chloride, antimony pentachloride and metallic zinc.

The particular olefine oxide used depends on the nature of the product desired; thus, for example chlorethyl phosphates may be prepared by the action of ethylene oxide on phosphorus oxychloride, while higher halogenated alkyl phosphates may be obtained by using higher olefine oxides. For example 1:2 propylene oxide will yield with phosphorus oxychloride esters in which one, two or all three of the chlorine atoms are replaced by a 2-chloro-propyl esterifying group; and epichlohydrin will yield esters in which one, two or all three of the chlorine atoms are replaced by a 2:3 dichloro-propyl group.

The reaction between the phosphorus oxyhalide and the olefine oxide proceeds very readily with considerable evolution of heat. If desired the reaction may be carried out under reflux, with or without cooling of the reaction vessel. However, if the olefine oxide is added to the phosphorus oxyhalide relatively slowly, it is quite possible to dispense with a reflux condenser, even when the reaction is conducted at a temperature exceeding considerably the boiling point of the olefine oxide. For example in the preparation of β-chlorethyl phosphate, ethylene oxide vapour may be led into phosphorus oxychloride containing aluminium chloride, and the temperature held, by cooling and regulation of the rate of flow of the vapour, at about 35° C. or higher; when the proportion of ethylene oxide reacted corresponds to about the diester stage, it may be necessary to heat the reaction vessel and to raise the temperature, for example to 55° C. or higher, in order to maintain a reasonable rate of reaction. Preferably unreacted ethylene oxide should not be allowed to accumulate.

If desired the reaction may be carried out under pressure higher than atmospheric, but good results are obtained by working at atmospheric pressure.

It is not in general necessary to employ a very high percentage of the catalyst, but the invention is not limited in this respect. For example, the catalyst may be present in amount of the order of ½%, 1% or 5% of the total weight of the reactants, or if desired, greater or smaller quantities of the catalyst, e. g. amounts up to 10% or more may be employed. It is important that the catalyst should be free from water.

The number of halogen alkyl groups in the resulting phosphoric ester may be controlled by varying the proportion of the olefine oxide which is allowed to react. Generally speaking, to obtain any particular degree of esterification, the theoretical quantity or a little more of the olefine oxide may be employed.

When the reaction between the olefine oxide and the phosphorus oxyhalide has proceeded to the desired stage, acidic material remaining may be neutralised, e. g. by means of a dilute alkali, especially sodium carbonate, and the resulting salt separated from the ester. Any olefine oxide remaining may be removed, for example by distillation under reduced pressure or in the case of the more volatile olefine oxides by distillation under atmospheric pressure. The esters may subsequently be subjected to any desired purification treatment.

The products of the invention find application as plasticisers and high boiling solvents, especially in compositions and articles having a bias of an organic derivative of cellulose:

The following examples illustrate without in any way limiting the invention.

Example 1

Ethylene oxide vapour is led slowly into phosphorus oxychloride containing about 1% of its weight of anhydrous aluminium chloride; the reactants are cooled, and the rate at which the ethylene oxide is added is adjusted so that the temperature of the reactants is held at about 35° C. When the reaction begins to slow down the cooling is discontinued, and sufficient heat is applied to the reactants to keep them at a temperature of about 55° C. The flow of ethylene oxide is continued until the amount added is slightly in excess of that theoretically required to produce tri-chlorethyl phosphate.

The reactants are allowed to stand for some hours, and the mixture is then agitated with dilute aqueous sodium carbonate; on standing or centrifuging an aqueous layer separates, which is drawn off. The ester remaining is washed free from alkali with water, and is dried by passing through it a stream of warm dried air.

Example 2

Epichlorhydrin is added to phosphorus oxychloride containing about 1% of anhydrous aluminium chloride at such a rate that the temperature of the reactants is maintained at about 60° C. When the reaction no longer proceeds sufficiently fast to keep the temperature up to 60° C. of itself, heat is applied and the temperature raised to 70°–80° C. The addition of epichlorhydrin is continued until a 10% excess, on the amount theoretically required to produce tri-(2:3-dichlorpropyl) phosphate, has been added, and the resulting mixture stirred at 70°–80° C. for some 20 minutes.

The mixture is then cooled and agitated with dilute aqueous sodium carbonate and with ether until it no longer contains any acidic material. The mixture is then separated, by gravity or centrifuging, into an aqueous and an ethereal layer and the former is run off. The ethereal layer is washed with water and the ether distilled off. The product is dried by passing through it warm dried air, and any unreacted epichlorhydrin remaining is removed by gentle distillation under reduced pressure.

Having described our invention what we desire to secure by Letters Patent is:

1. Process for the manufacture of halogenated alkyl phosphates, which comprises causing a phosphorus oxyhalide to react with an olefine oxide in the presence of aluminum chloride as catalyst.

2. Process for the manufacture of chlorinated alkyl phosphates, which comprises causing phosphorus oxychloride to react with an olefine oxide in the presence of aluminum chloride as catalyst.

3. Process for the manufacture of halogenated ethyl phosphates, which comprises causing a phosphorus oxyhalide to react with ethylene oxide in the presence of aluminum chloride as catalyst.

4. Process for the manufacture of halogenated propyl phosphates, which comprises causing a phosphorus oxyhalide to react with propylene oxide in the presence of aluminum chloride as catalyst.

5. Process for the manufacture of halogenated chloro-propyl phosphates, which comprises causing a phosphorus oxyhalide to react with epichlorhydrin in the presence of aluminum chloride as catalyst.

6. Process for the manufacture of halogenated alkyl phosphates, which comprises causing a phosphorus oxyhalide to react with an olefine oxide in the presence of aluminum chloride in amount between ½ and 5% of the weight of the phosphorus oxyhalide.

7. Process for the manufacture of halogenated alkyl phosphates, which comprises adding an olefine oxide in fluid form to a phosphorus oxyhalide containing aluminum chloride at such a rate that a substantial rise in temperature is avoided.

8. Process for the manufacture of chlorinated alkyl phosphates, which comprises adding an olefine oxide in fluid form to a phosphorus oxyhalide containing between ½ and 5% of its weight of aluminum chloride at such a rate that a substantial rise in temperature is avoided.

ARTHUR JOHN DALY.
WILLIAM GEOFFREY LOWE.